United States Patent
Gupta et al.

(10) Patent No.: US 11,094,314 B2
(45) Date of Patent: Aug. 17, 2021

(54) SYSTEM AND METHOD FOR DETECTING A SIMULATED EMERGENCY ALERT SIGNAL (EAS)

(71) Applicant: Interra Systems, Inc., Cupertino, CA (US)

(72) Inventors: Rohit Gupta, Noida (IN); Niraj Sinha, New Delhi (IN); Hemant Kumar Gangwar, Noida (IN); Manik Gupta, Delhi (IN)

(73) Assignee: Interra Systems, Cupertino, CA (US)

(*) Notice: Subject to any disclaimer, the term of this patent is extended or adjusted under 35 U.S.C. 154(b) by 0 days.

(21) Appl. No.: 16/746,871

(22) Filed: Jan. 18, 2020

(65) Prior Publication Data

US 2021/0225359 A1  Jul. 22, 2021

(51) Int. Cl.
| | |
|---|---|
| *G10L 19/02* | (2013.01) |
| *H04H 20/59* | (2008.01) |
| *G10L 15/02* | (2006.01) |
| *G10L 15/20* | (2006.01) |

(52) U.S. Cl.
CPC .............. *G10L 15/02* (2013.01); *G10L 15/20* (2013.01)

(58) Field of Classification Search
CPC ......... G10L 19/02; G10L 25/03; G10L 25/51; H04H 20/59; H04N 21/814
USPC ............... 704/205, 206, 211, 231, 251, 270; 725/33
See application file for complete search history.

(56) References Cited

U.S. PATENT DOCUMENTS

| | | | |
|---|---|---|---|
| 2,882,390 A * | 4/1959 | Kuhl, Jr. | H03F 1/54 455/228 |
| 3,701,024 A * | 10/1972 | Knowles | H04H 20/59 455/526 |
| 4,633,515 A | 12/1986 | Uber et al. | |
| 5,995,553 A | 11/1999 | Crandall et al. | |
| 6,323,767 B1 | 11/2001 | Gropper | |
| 6,498,627 B1 * | 12/2002 | Hershey | H04N 21/8146 725/33 |
| 7,454,773 B2 * | 11/2008 | Pugel | H04H 20/59 725/33 |
| 8,825,188 B2 * | 9/2014 | Stone | G10L 25/21 700/94 |
| 8,841,990 B2 * | 9/2014 | Bell | G08B 27/001 340/7.45 |
| 10,755,730 B1 * | 8/2020 | Maurer | G10L 25/51 |
| 2003/0121036 A1 * | 6/2003 | Lock | H04N 21/814 725/33 |
| 2005/0086685 A1 | 4/2005 | Rahman et al. | |

(Continued)

FOREIGN PATENT DOCUMENTS

JP    H09257970 A    10/1997

*Primary Examiner* — Martin Lerner
(74) *Attorney, Agent, or Firm* — Bengamin Balser; Next IP Law Group

(57) ABSTRACT

A system and a method for detecting a simulated Emergency Alert Signal (EAS) are disclosed. The method includes detecting, by a first detector, one or more tones in a plurality of audio frames. Further, the method includes detecting, by a second detector, one or more beeps in the plurality of audio frames. Thereafter, the method includes detecting, by a third detector, at least one emergency word in the plurality of audio frames based at least on the detected one or more tones or the detected one or more beeps, and thereby detecting the simulated EAS.

18 Claims, 7 Drawing Sheets

(56) References Cited

U.S. PATENT DOCUMENTS

| | | | |
|---|---|---|---|
| 2006/0184962 A1* | 8/2006 | Kendall | H04H 20/59 |
| | | | 725/33 |
| 2007/0263669 A1 | 11/2007 | Maginity et al. | |
| 2009/0031340 A1* | 1/2009 | Modi | H04N 21/814 |
| | | | 725/33 |
| 2009/0181639 A1* | 7/2009 | Glanton | H04W 76/50 |
| | | | 455/404.1 |
| 2012/0084808 A1* | 4/2012 | Howarter | H04N 21/4583 |
| | | | 725/33 |
| 2015/0256276 A1* | 9/2015 | Jones | H04H 60/65 |
| | | | 455/3.01 |
| 2016/0192034 A1* | 6/2016 | Yamane | H04N 21/814 |
| | | | 725/33 |
| 2017/0013093 A1* | 1/2017 | Kwon | H04L 65/4076 |
| 2017/0332111 A1* | 11/2017 | Mun | H04H 20/33 |
| 2018/0359536 A1* | 12/2018 | Ward | H04N 21/4821 |
| 2020/0077159 A1* | 3/2020 | Deshpande | H04N 21/435 |

* cited by examiner

SYSTEM AND METHOD FOR DETECTING A SIMULATED EMERGENCY ALERT SIGNAL (EAS)

FIELD OF THE DISCLOSURE

The present disclosure is generally related to Emergency Alert Signal (EAS), and more particularly related to a method and system for detecting a simulated Emergency Alert Signal (EAS).

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Emergency alert system is a national warning system which is primarily designed to allow president or government agencies to address the country on all radio and television stations via an emergency action notification message. The emergency alert system is used to distribute information regarding imminent threats to public safety in a smaller area, such as severe weather situations including flash floods, tornadoes, and other civic emergencies. Typically, an Emergency Alert Signal (EAS) follows defined standard which has four parts such as beeps which contain Frequency Shift Keying (FSK) modulated header which signals the start of the EAS message, an attention signal which is notification test tone of around 1000 Hz, audio announcement, and FSK modulated end of message marker.

Currently, broadcasters or content creators add EAS messages and/or simulated EAS messages in programs such as educational or entertainment program to make the programs attractive and realistic for viewers. Therefore, in order to protect the integrity of emergency alert systems, Federal Communications Commission (FCC) prohibits EAS like tones and attention signals i.e. both the EAS messages and the simulated EAS messages outside of genuine alerts or authorized public service announcements, especially when the EAS messages are used to capture audience attention during advertisements, dramatic, entertainment, and educational programs. Therefore, in order to bypass FCC regulation, production houses usually add simulated EAS tones or beeps in the program. Such simulated EAS message contain incomplete EAS-like beeps or tones along with warning message. Further, the simulated EAS do not contain FSK modulated header which makes it impossible to detect using conventional FSK demodulation technique. However, broadcasters who misuse the EAS tones are subjected to hefty fines by the FCC.

Therefore, there is a need for an improved method and system for detecting the simulated EAS message which could help broadcasters to avoid hefty fines by the FCC.

SUMMARY OF THE INVENTION

According to embodiments illustrated herein, a method for detecting a simulated Emergency Alert Signal (EAS) is disclosed. The method includes detecting, by a first detector, one or more tones in a plurality of audio frames. The method further includes detecting, by a second detector, one or more beeps in the plurality of audio frames. Thereafter, the method includes detecting, by a third detector, at least one emergency word in the plurality of audio frames based at least on the detected one or more tones or the detected one or more beeps, and thereby detecting the simulated EAS.

According to embodiments illustrated herein, a system for detecting a simulated Emergency Alert Signal (EAS) is disclosed. The system includes a first detector for detecting one or more tones in a plurality of audio frames. The system further includes a second detector for detecting one or more beeps in the plurality of audio frames. Thereafter, the system includes a third detector for detecting at least one emergency word in the plurality of audio frames based at least on the detected one or more tones or the detected one or more beeps, and thereby detecting the simulated EAS.

According to embodiments illustrated herein, a non-transitory computer readable medium stores a computer program code for detecting a simulated Emergency Alert Signal (EAS) is disclosed. The computer program code is executable by at least one processor. The at least one processor is configured to detect one or more tones in a plurality of audio frames. The at least one processor is further configured to detect one or more beeps in the plurality of audio frames. Thereafter, the at least one processor is configured to detect at least one emergency word in the plurality of audio frames based at least on the detected one or more tones or the detected one or more beeps, and thereby detecting the simulated EAS.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems, and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
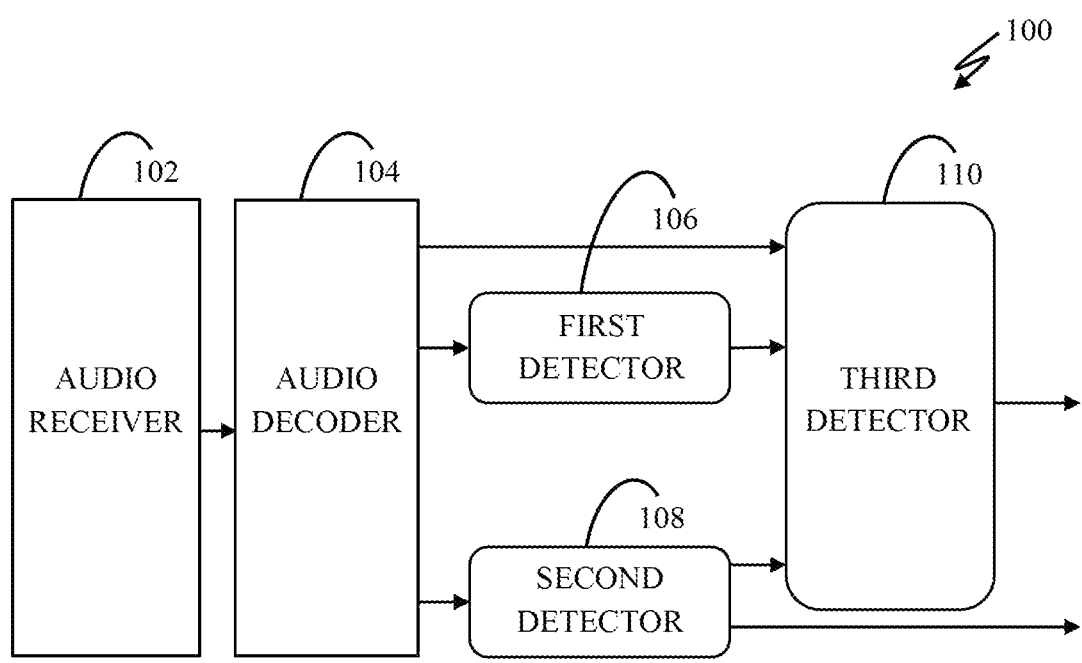
FIG. 1 illustrates a block diagram of a system 100 for detecting a simulated Emergency Alert Signal (EAS), according to an embodiment.

FIG. 1 illustrates a block diagram of a system 100 for detecting a simulated Emergency Alert Signal (EAS), according to an embodiment. The system 100 includes an audio receiver 102, an audio decoder 104, a first detector 106, a second detector 108, and a third detector 110. The system 100 may further include one or more components such as a display device, an output device etc., without departing from the scope of the disclosure.

The audio receiver 102 may be configured to receive an audio signal. Further, the audio decoder 104 may be configured to decode the received audio signal. The received audio signal may be decoded into a plurality of audio frames in time domain, by the first detector 106. Further, the first detector 106 may be configured to detect one or more tones in the plurality of audio frames. The first detector 106 may be referred to as a tone detector. Further, the second detector 108 may be configured to detect one or more beeps in the plurality of audio frames. The second detector 108 may be referred to as a beep detector. Further, the third detector 110 may be configured to detect at least one emergency word in the plurality of audio frames. In one embodiment, the at least one emergency word may be detected based at least on the detected one or more tones or the detected one or more beeps. The third detector 110 may be referred to as an emergency word detector i.e. speech to text engine. It should be noted that the emergency word detector may be based on Automatic Speech Recognition (ASR) technology.

Further, the system 100 may include a processor (not shown) and a memory (not shown). The processor includes suitable logic, circuitry, and/or interfaces that are operable to execute one or more instructions stored in the memory to perform predetermined operations. The processor may execute an algorithm stored in the memory for detecting the simulated EAS. The processor may also be configured to decode and execute any instructions received from one or more other electronic devices or server(s). The processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor may be further configured to execute one or more computer-readable program instructions, such as program instructions to carry out any of the functions described in the description provided below.

The memory stores a set of instructions and data. Further, the memory includes the one or more instructions that are executable by the processor to perform specific operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

Figure 2:
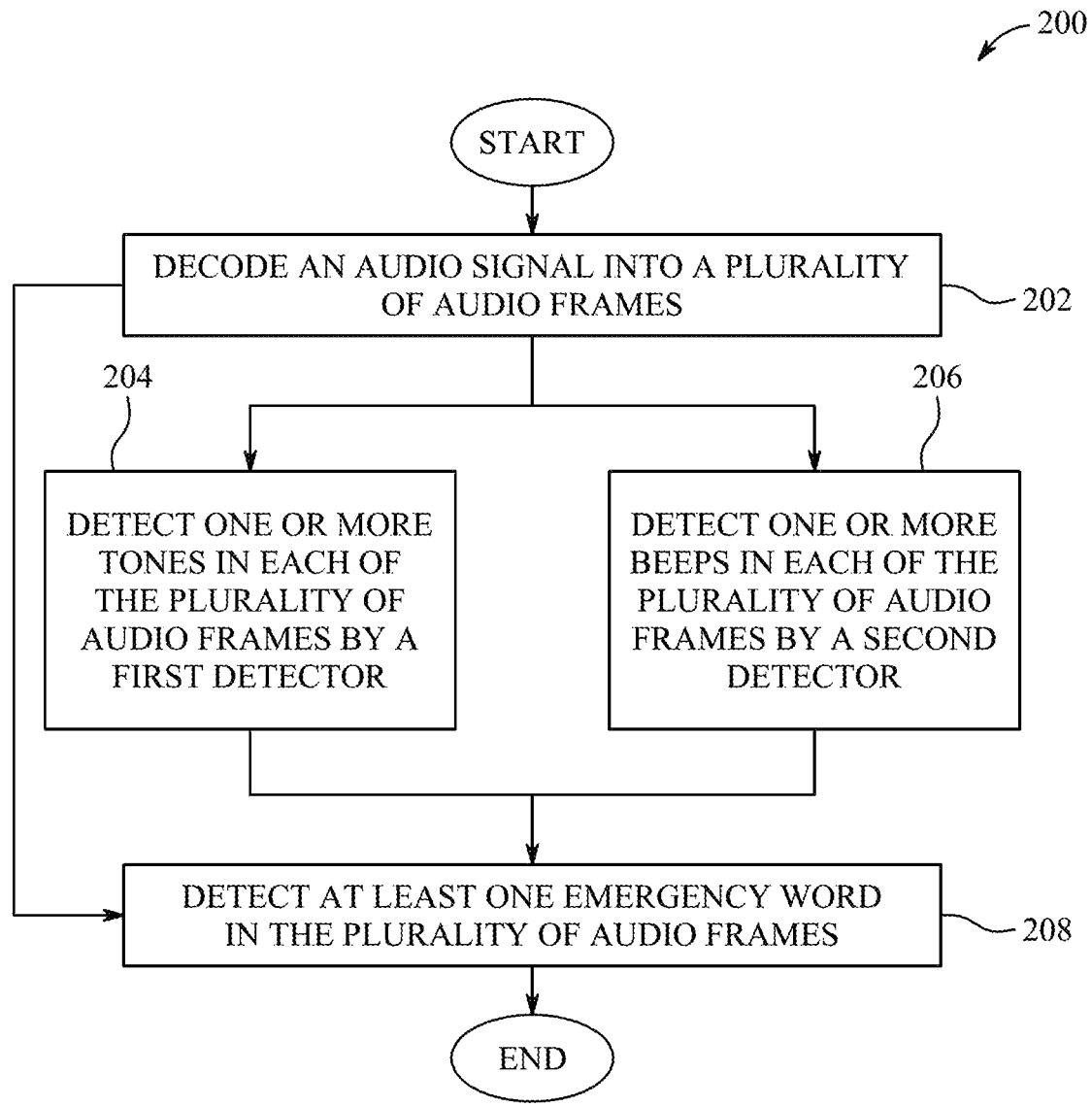
FIG. 2 illustrates a flowchart 200 showing a method for detecting the simulated EAS, according to an embodiment.

FIG. 2 illustrates a flowchart 200 showing a method for detecting the simulated EAS, according to an embodiment. FIG. 2 is explained in conjunction with the elements disclosed in FIG. 1.

The flowchart 200 of the FIG. 2 shows the architecture, functionality, and operation for detecting the simulated EAS. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in the FIG. 2 may be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart 200 starts at the step 202 and proceeds to step 208.

Figure 3:
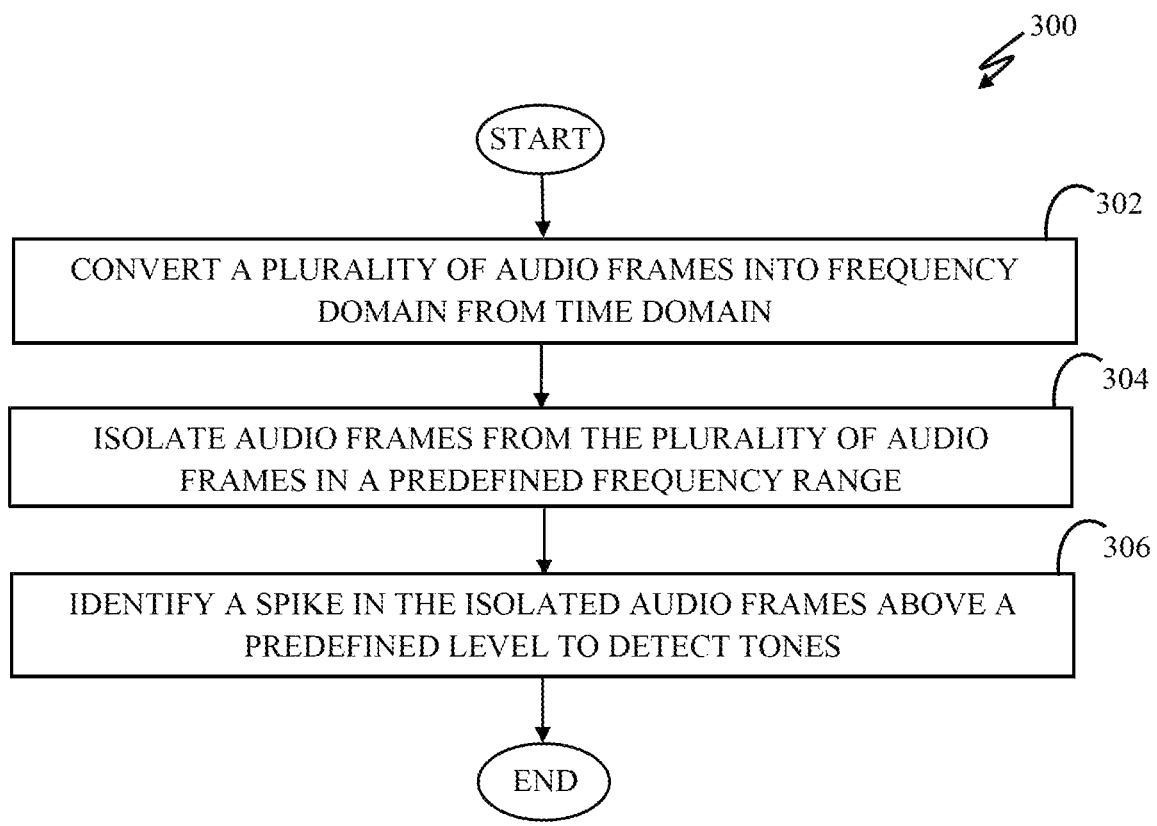
FIG. 3 illustrates a flowchart 300 showing a method for detecting one or more tones in a plurality of audio frames, by a first detector 106, according to an embodiment.

At first, the audio signal may be received by the audio receiver 102. The received audio signal may be decoded into plurality of audio frames, at step 202. The audio signal may be decoded into the plurality of audio frames in time domain, by the audio decoder 104. Further, in one embodiment, one or more tones may be detected in each of the plurality of audio frames, at step 204. The one or more tones may be detected by the first detector 106. As discussed above, the first detector 106 is a tone detector. The detection of the one or more tones by the first detector 106 is explained in conjunction with FIG. 3.

At step 302, the plurality of audio frames may be converted into frequency domain from the time domain. It should be noted that a discrete cosine transform (DCT) may be performed to convert the plurality of audio frames into the frequency domain, to determine frequency content in the audio signal. At step 304, audio frames having a spike, may be isolated from the plurality of audio frames in a predefined frequency range. In one case, the predefined frequency range is 900-1200 Hertz. At step 306, the spike may be identified in each of the isolated audio frames, above a predefined level, to detect one or more tones. The one or more tones detected in the plurality of audio frames may be 8 to 25 seconds long. The predefined level may correspond to an amplitude of energy at a frequency corresponding to the spike.

Figure 4:
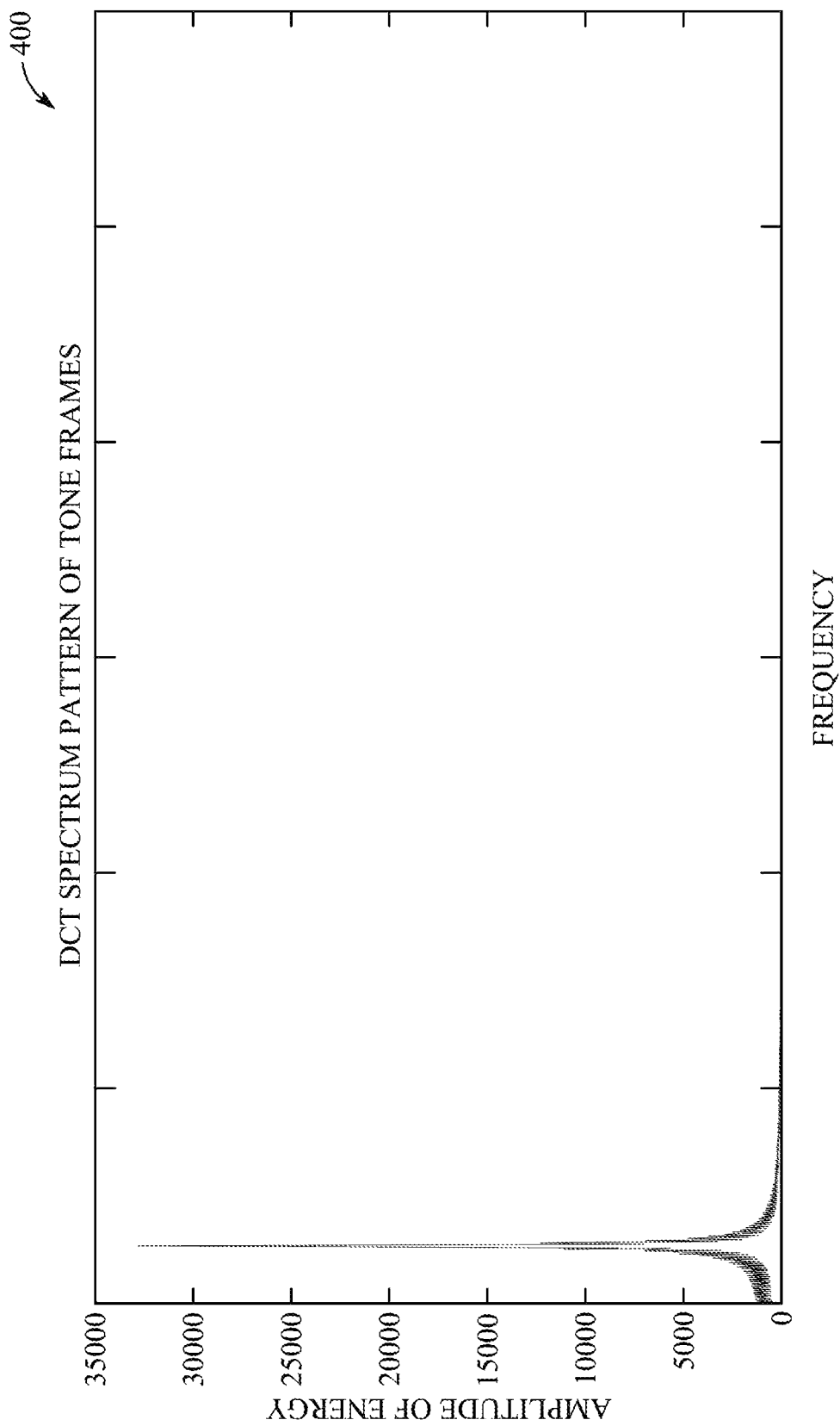
FIG. 4 illustrates a graph 400 showing detection of a spike in a predefined frequency range, by the first detector 106, according to an embodiment.

It should be noted that the isolated audio frames having spike, may be referred to as one or more tone frames. It should be noted that DCT spectrum pattern of tone frames is shown in graph 400 of FIG. 4. In one embodiment, if one or more non-tone frames are identified between the one or more detected tone frames, then the one or more non-tone frames may be ignored to obtain a continuous tone segment of long duration. In another embodiment, if the one or more tone frames are identified continuously for a minimum duration of around 1 second, then EAS like tone segment may be detected. Based at least on the detection of the EAS like tone segment, such EAS like tone segment may be added to an array list containing probable simulated EAS messages. Thereafter, at least one emergency word may be detected in the EAS like tone segment, at step 208. The at least one emergency word may be detected by converting one-minute audio adjacent to the detected EAS like tone segment into text. It should be noted that neighboring audio of the detected EAS like tone segment may be converted into text. In one example, the emergency word may include, but is not limited to, tornadoes, emergency, or storms. Based at least on the detection of the emergency word, the simulated EAS may be detected in the received audio signal.

Figure 5:
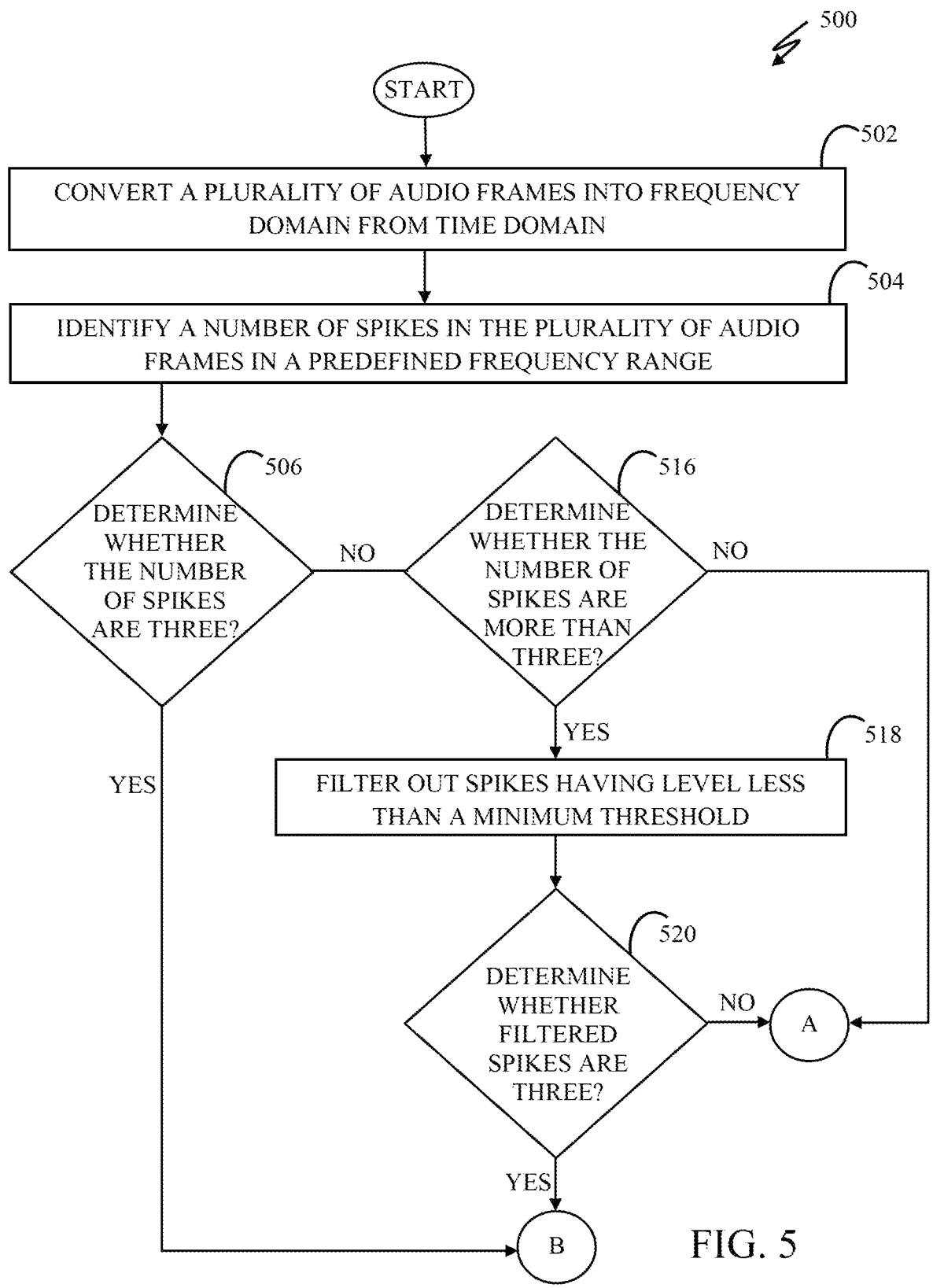
FIG. 5 illustrates a flowchart 500 showing a method for detecting one or more beeps in the plurality of audio frames, by a second detector 108, according to an embodiment.
Figure 5:
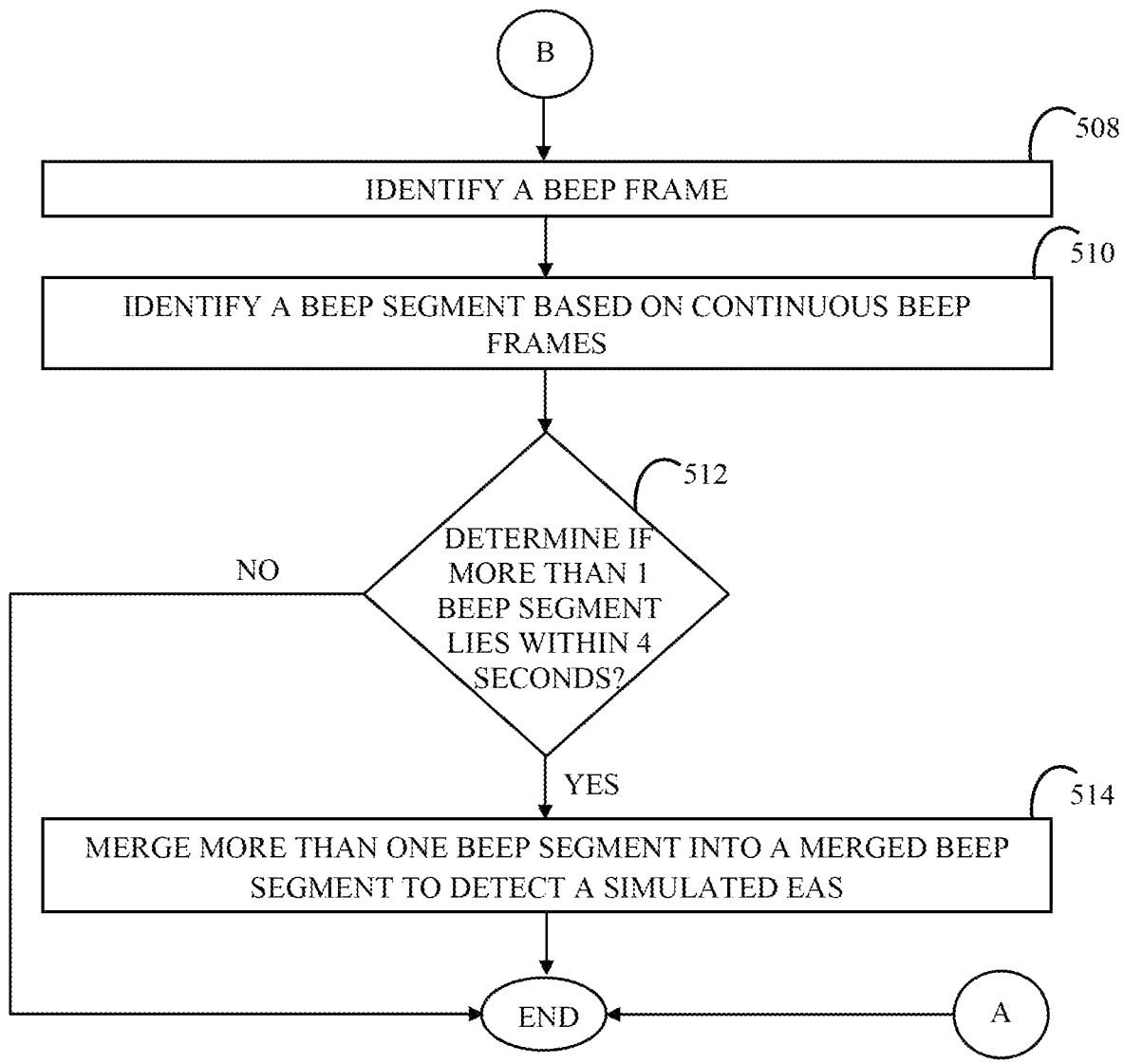

In another embodiment, one or more beeps may be detected in each of the plurality of audio frames, at step 206. The one or more beeps may be detected by the second detector 108. As discussed above, the second detector 108 is a beep detector. The detection of the one or more beeps by the second detector 108 is explained in conjunction with FIG. 5. At step 502, the plurality of audio frames may be converted into frequency domain from the time domain. It should be noted that a discrete cosine transform (DCT) may be performed to convert the plurality of audio frames into the frequency domain, to determine frequency content in the audio signal.

At step 504, a number of spikes may be identified in the plurality of audio frames, of the frequency domain, in a predefined frequency range. The predefined frequency range is 1500-2200 Hertz. It should be noted that the spikes may be equidistant spikes. Further, each of the number of spikes may be above a predefined level that corresponds to an amplitude of energy at a frequency corresponding to each of the number of spikes. In an exemplary embodiment, the predefined level is 300. Further, the distance between two consecutive spikes in the number of spikes may be greater than a minimum threshold. In one case, the minimum threshold may depend on an audio sampling frequency.

Figure 6:
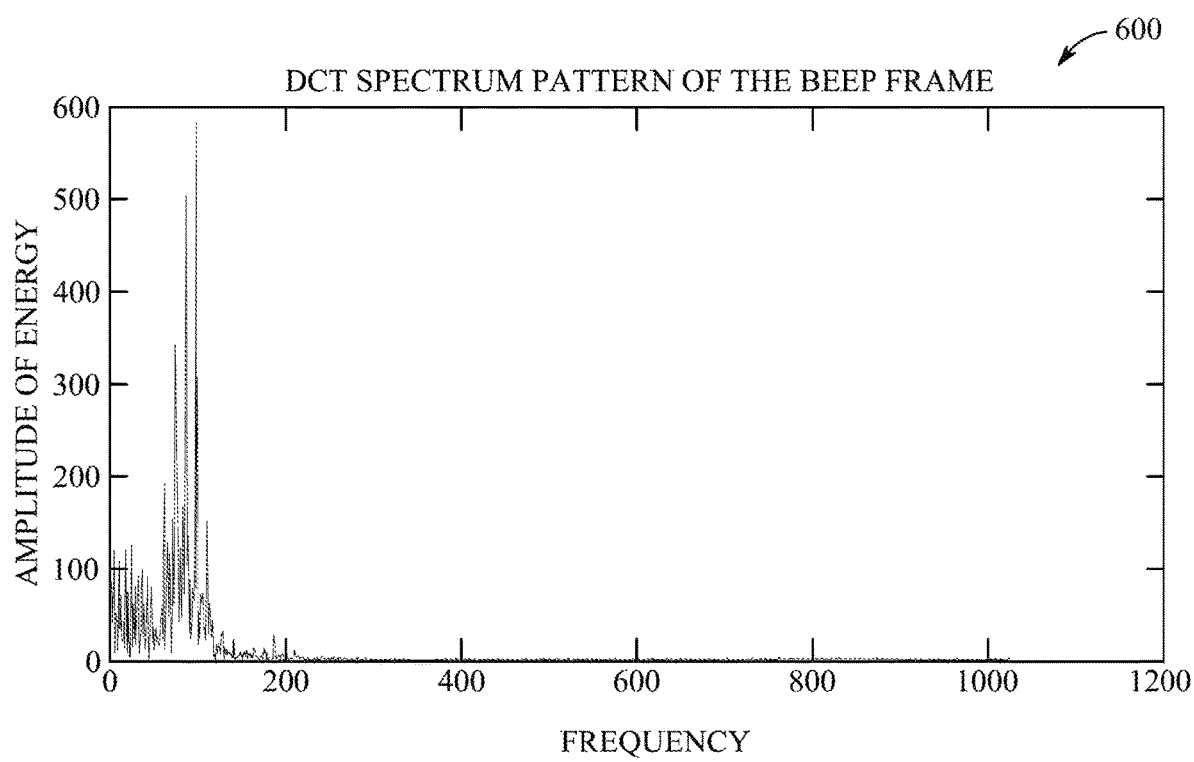
FIG. 6 illustrates a graph 600 showing detection of three spikes in a predefined frequency range, by the second detector 108, according to an embodiment.

At step 506, it is determined whether the number of spikes are equal to three. In one case, if the number of spikes are equal to three, then a beep frame may be identified, by the second detector 108, at step 508. It should be noted that DCT spectrum pattern of the beep frame is shown in graph 600 of FIG. 6. At step 510, a beep segment may be identified based at least on continuous beep frames having same spike frequencies as in a first beep frame of the continuous beep frames. It should be noted that if the duration of the beep segment lies in the range of 150 milliseconds to 1 second, then EAS like beep segment may be detected. Further, if one or more non-beep frames are detected between the one or more detected beeps, then the one or more non-beep frames may be ignored to obtain continuous beep frames of long duration.

At step 512, it is determined whether more than one beep segment lies within a duration of four seconds. In one case, if more than one beep segment lies within the duration of four seconds, then the more than one beep segment may be merged into a merged beep segment, a step 514. The merged beep segment may be referred to as a strong beep segment. Such detection of the strong beep segment may confirm the detection of the simulated EAS in the audio signal. In another case, if only one beep segment is detected within a duration of four seconds, then the beep segment may be referred to as a weak beep segment. Such weak beep segment may be further validated by the third detector 110. The third detector 110 may detect at least an emergency word in the audio frame having the weak beep segment, at step 208. The at least one emergency word may be detected by converting neighboring one-minute audio of the detected weak beep segment into text. In one example, the emergency word may include, but is not limited to, tornadoes, emergency, hurricane, flood, tsunami, earthquake, alarming, terror, disaster, or storms. Based at least on the detection of the emergency word, the simulated EAS may be detected in the audio signal.

Again at step 506, in another case, if the number of spikes are not equal to three, then it may be determined whether the number of spikes are more than three, at step 516. In one case, if the number of spikes are not more than three, then the process ends. Otherwise, if the number of spikes are more than three, then one or more spikes having a level less than a minimum threshold may be filtered out, at step 518. The minimum threshold may be based on a maximum level of frame in the predefined frequency range. At step 520, it is determined whether the number of the filtered out spikes are three. In one case, if the number of the filtered out spikes are three, then the method follows the steps 508 to 514. Otherwise, the process ends.

In another embodiment, after step 202, at least one emergency word may be detected in the plurality of audio frames, at step 208. It should be noted that the plurality of audio frames may be converted into text using the third detector 110. The third detector 110 may further detect at least one emergency word in the converted text. For example, the emergency word is 'national weather service'. Thereafter, based at least on the detection of the at least one emergency word, the simulated EAS may be detected.

The disclosed embodiments encompass numerous advantages. Various embodiments of method and system for detecting the simulated EAS message have been disclosed. The disclosed embodiments provide a better method and system for detecting the simulated EAS message to help broadcasters to avoid hefty fines by the FCC. Such method and system allows various educational and entertainment programs to use the simulated EAS messages for making the programs more attractive. Therefore, such method and system for detecting the simulated EAS is efficient.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method for detecting a simulated Emergency Alert Signal (EAS), the method comprising:
   detecting, by a first detector, one or more tones in a plurality of audio frames, wherein the detection of the one or more tones further comprises:
      isolating audio frames having a spike, from the plurality of audio frames of a frequency domain in a predefined frequency range; and
      identifying the spike in each isolated audio frames, above a predefined level, to detect the one or more tones;
   detecting, by a second detector, one or more beeps in the plurality of audio frames; and
   detecting, by a third detector, at least one emergency word in the plurality of audio frames based at least on the detected one or more tones or the detected one or more beeps, and thereby detecting the simulated EAS.

2. The method of claim 1, further comprising decoding, by an audio decoder, an audio signal into the plurality of audio frames in time domain.

3. The method of claim 1, further comprising performing discrete cosine transform (DCT) of the plurality of audio frames to convert the plurality of audio frames into the frequency domain from the time domain.

4. The method of claim 3, wherein the detection of the one or more beeps further comprises identifying three spikes in the plurality of audio frames of the frequency domain in a predefined frequency range, for detecting the one or more beeps.

5. The method of claim 4, wherein each of the three spikes is above a predefined level and the difference between frequency of two spikes is greater than a minimum threshold, wherein the minimum threshold depends on audio sampling frequency and the predefined level corresponds to an amplitude of energy at a frequency corresponding to the each of the three spikes.

6. The method of claim 5, wherein the predefined frequency range is 1500-2200 Hertz and the predefined level is 300.

7. The method of claim 4, further comprising:
   identifying a beep frame based on the three spikes;
   identifying a beep segment based at least on continuous beep frames having same spike frequencies as in a first beep frame of the continuous beep frames; and
   detecting the simulated EAS when more than one beep segment is identified within a duration of 4 seconds.

8. The method of claim 7, wherein duration of the beep segment lies in a range of 150 milliseconds to 1 second.

9. The system of claim 8, wherein the luminance flashes are adjusted to reduce Photosensitive Epilepsy (PSE) triggers.

10. The method of claim 1, wherein the predefined frequency range is 900-1200 Hertz.

11. The method of claim 1, wherein the one or more tones detected in the plurality of audio frames are 8 to 25 seconds long.

12. The method of claim 1, wherein the at least one emergency word comprises at least one of tornadoes, emergency, hurricane, flood, tsunami, earthquake, alarming, terror, disaster, or storms.

13. A system for detecting a simulated Emergency Alert Signal (EAS), the system comprising:
   a first detector for detecting one or more tones in a plurality of audio frames, wherein the detection of the one or more tones further comprises:
      isolating audio frames having a spike, from the plurality of audio frames of a frequency domain in a predefined frequency range; and
      identifying the spike in each isolated audio frames, above a predefined level, to detect the one or more tones;
   a second detector for detecting one or more beeps in the plurality of audio frames; and
   a third detector for detecting at least one emergency word in the plurality of audio frames based at least on the detected one or more tones or the detected one or more beeps, and thereby detecting the simulated EAS.

14. The system of claim 13, further comprising performing discrete cosine transform (DCT) of the plurality of audio frames to convert the plurality of audio frames into the frequency domain from the time domain.

15. The system of claim 14, wherein the detection of the one or more beeps further comprises identifying three spikes in the plurality of audio frames of the frequency domain in a predefined frequency range, for detecting the one or more beeps.

16. The system of claim 15, wherein the predefined frequency range is 1500-2200 Hertz.

17. The system of claim 14, wherein the predefined frequency range is 900-1200 Hertz.

18. A non-transitory computer-readable medium for storing instructions, wherein the instructions are executed by at least one processor, wherein the at least one processor is configured to:
   detect one or more tones in a plurality of audio frames, wherein the one or more tones are detected in the plurality of audio frames by:
      isolating audio frames having a spike, from the plurality of audio frames of a frequency domain in a predefined frequency range; and
      identifying the spike in each isolated audio frames, above a predefined level, to detect the one or more tones;
   detect one or more beeps in the plurality of audio frames; and
   detect at least one emergency word in the plurality of audio frames based at least on the detected one or more tones or the detected one or more beeps, and thereby detecting the simulated EAS.

* * * * *